United States Patent
Jones et al.

(10) Patent No.: US 10,744,572 B2
(45) Date of Patent: Aug. 18, 2020

(54) ORBITAL DRILL BUSHING ADAPTER

(71) Applicant: The Boeing Company, Chicago, IL (US)

(72) Inventors: Douglas A. Jones, Everett, WA (US); Brent F. Craig, Everett, WA (US); Matthew K. Roberts, San Marcos, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 16/167,349

(22) Filed: Oct. 22, 2018

(65) Prior Publication Data

US 2020/0122243 A1    Apr. 23, 2020

(51) Int. Cl.
*B23B 49/02*    (2006.01)
*B23B 47/28*    (2006.01)
*B23C 3/02*    (2006.01)

(52) U.S. Cl.
CPC ............ *B23B 49/023* (2013.01); *B23B 47/28* (2013.01); *B23C 3/02* (2013.01); *B23C 2220/52* (2013.01); *Y10T 408/568* (2015.01)

(58) Field of Classification Search
CPC ..... B23B 47/28; B23B 47/287; B23B 49/023; B23B 49/02; B23B 2247/12; B23B 45/003; B23C 3/02; B23C 2220/52; Y10T 408/568; Y10T 408/567; Y10T 408/569
See application file for complete search history.

(56) References Cited

U.S. PATENT DOCUMENTS

| | | | | | |
|---|---|---|---|---|---|
| 1,804,381 | A | * | 5/1931 | Bolender | ................ B23B 47/28 408/241 R |
| 3,062,076 | A | * | 11/1962 | Craig | ................... B23B 47/288 408/105 |
| 3,097,891 | A | * | 7/1963 | Brideau | ................. B23B 49/02 384/31 |
| 4,668,134 | A | * | 5/1987 | Vindez | ................. B23B 49/023 408/130 |
| 2009/0279969 | A1 | * | 11/2009 | Mejerwall | ............... B23B 49/02 408/115 R |

FOREIGN PATENT DOCUMENTS

GB    588599 A  *  5/1947 ............ B23B 51/08

* cited by examiner

*Primary Examiner* — Eric A. Gates
*Assistant Examiner* — Chwen-Wei Su
(74) *Attorney, Agent, or Firm* — Duft & Bornsen, PC (57) ABSTRACT

An orbital drill bushing adapter for use with a drill unit. In one embodiment, the orbital drill bushing adapter comprises a main body and locking arms. The main body includes a base member having an upper surface, a lower surface, and an external side wall that extends between the upper surface and the lower surface. The main body further includes a cylindrical spacer that projects from the lower surface of the base member, and is configured to fit in a drill hole of an orbital drill bushing. The main body includes a cylindrical hole that passes through the base member and the cylindrical spacer. The locking arms are pivotally coupled to the base member, and are configured to clamp the main body onto the orbital drill bushing.

20 Claims, 8 Drawing Sheets

ORBITAL DRILL BUSHING ADAPTER

FIELD

This disclosure relates to the field of tooling, and more particularly, to a drill bushing or similar apparatus.

BACKGROUND

The fabrication of objects, such as aircraft, sometimes requires drilling holes into a workpiece, such as a sheet of metal, a sheet of composite material, etc. To facilitate the drilling of holes, an apparatus known as a drill bushing is used to guide, position, and support a drill unit during drilling operations. A typical drill bushing includes a body of hardened metal, with a drill hole through the center of the body. The drill bit passes through the drill hole to form a corresponding hole in the workpiece. Therefore, drill holes can be precisely formed into the workpiece.

SUMMARY

Embodiments described herein include an adapter configured to convert an orbital drill bushing into another type of drill bushing, such as a conventional power-feed drill bushing. Generally, there are different drill bushings for each type of drilling method, and the nosepiece of the different drill units (i.e., an orbital drill, a power-feed drill, etc.) are configured to couple with a certain type of drill bushing. When an orbital drill bushing is used at a location on a drill plate, for example, it is time consuming to replace the orbital drill bushing with another type of drill bushing to allow for a different drilling operation at that location. The adapter as described herein transforms an orbital drill bushing into another type of drill bushing, so that a power-feed drill, for example, may couple with the adapter to allow for another type of drilling operation at the location of the orbital drill bushing. This advantageously creates huge time savings by opening up orbital drill bushings to other drill units.

One embodiment comprises an orbital drill bushing adapter comprising a main body and locking arms. The main body includes a base member having an upper surface, a lower surface, and an external side wall that extends between the upper surface and the lower surface. The main body includes a cylindrical spacer that projects from the lower surface of the base member, and is configured to fit in a drill hole of an orbital drill bushing. The main body includes a cylindrical hole that passes through the base member and the cylindrical spacer. The locking arms are pivotally coupled to the base member, and are configured to clamp the main body onto the orbital drill bushing.

In another embodiment, the locking arms are configured to engage an annular receiver groove on the orbital drill bushing when the locking arms are in a clamped position.

In another embodiment, the locking arms are elongated members having a first end and a second end, and having an inner side between the first end and the second end that faces toward the cylindrical spacer. The first end includes a mounting hole configured to pivotally couple the locking arms to the base member via an arm connector. A clamp member is mounted on the second end.

In another embodiment, the inner side is concave between the first end and the second end, and the inner side includes a coupling lip configured to engage the annular receiver groove on the orbital drill bushing.

In another embodiment, a radius of curvature of the coupling lip corresponds with a radius of curvature of the annular receiver groove on the orbital drill bushing.

In another embodiment, the inner side has a concave surface, and the coupling lip projects from the concave surface via an angled surface.

In another embodiment, arm support slots indent inward from the external side wall of the base member, and the locking arms further include axial support bolts attached to a top side of the locking arms to engage the arm support slots when the locking arms are pivoted towards one another.

In another embodiment, a shoulder projects outward from the external side wall in a radial direction from an axis of the cylindrical hole, the locking arms pivotally couple to the base member at the shoulder via arm connectors, and the arm connectors define pivot axes for the locking arms that are parallel and spaced by a distance on a side of the cylindrical hole.

In another embodiment, the main body further includes a drill bushing inserted in the cylindrical hole that is configured to guide a non-orbital drill unit.

In another embodiment, the main body further includes twist-lock fasteners that project perpendicularly from the upper surface of the base member, and are configured to engage with a twist-lock feature on a nosepiece of a drill unit.

In another embodiment, the main body further includes a locking pin that projects perpendicularly from the lower surface of the base member, and is disposed at a distance radially from the cylindrical spacer.

Another embodiment comprises an orbital drill bushing adapter that includes a main body and locking arms. The main body comprises a base member having an upper surface configured to face a drill unit, and a lower surface configured to contact a top end of an orbital drill bushing. The main body further comprises a cylindrical spacer that projects from the lower surface of the base member, and is configured to fit into a drill hole of the orbital drill bushing. The main body further comprises a cylindrical hole that passes through the base member and the cylindrical spacer. The locking arms are pivotally coupled to the base member, and are configured to pivot towards and away from one another about the base member. The locking arms, when pivoted towards one another, are configured to engage an annular receiver groove on the orbital drill bushing.

In another embodiment, an inner side of the locking arms is concave between a first end and a second end. The first end is pivotally coupled to the base member, and a clamp member is mounted on the second end. The inner side of the locking arms includes a coupling lip that projects from a surface of the inner side, and is configured to engage the annular receiver groove.

In another embodiment, the coupling lip projects at an angle from the surface that corresponds with an angled surface of the annular receiver groove.

In another embodiment, the base member further has an external side wall that extends between the upper surface and the lower surface, and a shoulder that projects outward from the external side wall in a radial direction from an axis of the cylindrical hole. The locking arms pivotally couple to the base member at the shoulder via arm connectors. The arm connectors define pivot axes for the locking arms that are parallel and spaced by a distance on a side of the cylindrical hole.

In another embodiment, the base member further has an external side wall that extends between the upper surface and the lower surface, and arm support slots that indent inward from the external side wall. The locking arms further include axial support bolts attached to a top side of the locking arms to engage the arm support slots when the locking arms are pivoted towards one another.

In another embodiment, the main body further includes a drill bushing inserted in the cylindrical hole that is configured to guide a non-orbital drill unit.

In another embodiment, the main body further includes twist-lock fasteners that project from the upper surface of the base member on opposite sides of the cylindrical hole, and are configured to couple with a nosepiece of a drill unit.

In another embodiment, the main body further includes a locking pin that projects perpendicularly from the lower surface of the base member at a distance radially from the cylindrical spacer, and is configured to fit in a hole in a drill plate proximate to the orbital drill bushing.

Another embodiment comprises an orbital drill bushing adapter comprising a main body and locking arms pivotally coupled to the main body. The main body includes a base member having an upper surface and a lower surface, and a cylindrical spacer that projects from the lower surface of the base member. The cylindrical spacer is configured to fit in a drill hole of an orbital drill bushing. The main body further includes a cylindrical hole that passes through the base member and the cylindrical spacer, and a drill bushing inserted in the cylindrical hole that is configured to guide a non-orbital drill unit. The locking arms are configured to pivot away from one another to an open position, and to pivot towards one another to a clamped position. The locking arms each include a coupling lip configured to engage an annular receiver groove on the orbital drill bushing when the locking arms are in the clamped position. The locking arms further include clamp members configured to secure the locking arms together in the clamped position.

The features, functions, and advantages that have been discussed can be achieved independently in various embodiments or may be combined in yet other embodiments, further details of which can be seen with reference to the following description and drawings.

DESCRIPTION OF THE DRAWINGS

Some embodiments of the present invention are now described, by way of example only, with reference to the accompanying drawings. The same reference number represents the same element or the same type of element on all drawings.

DETAILED DESCRIPTION

The figures and the following description illustrate specific exemplary embodiments. It will be appreciated that those skilled in the art will be able to devise various arrangements that, although not explicitly described or shown herein, embody the principles described herein and are included within the contemplated scope of the claims that follow this description. Furthermore, any examples described herein are intended to aid in understanding the principles of the disclosure, and are to be construed as being without limitation. As a result, this disclosure is not limited to the specific embodiments or examples described below, but by the claims and their equivalents.

Figure 1:
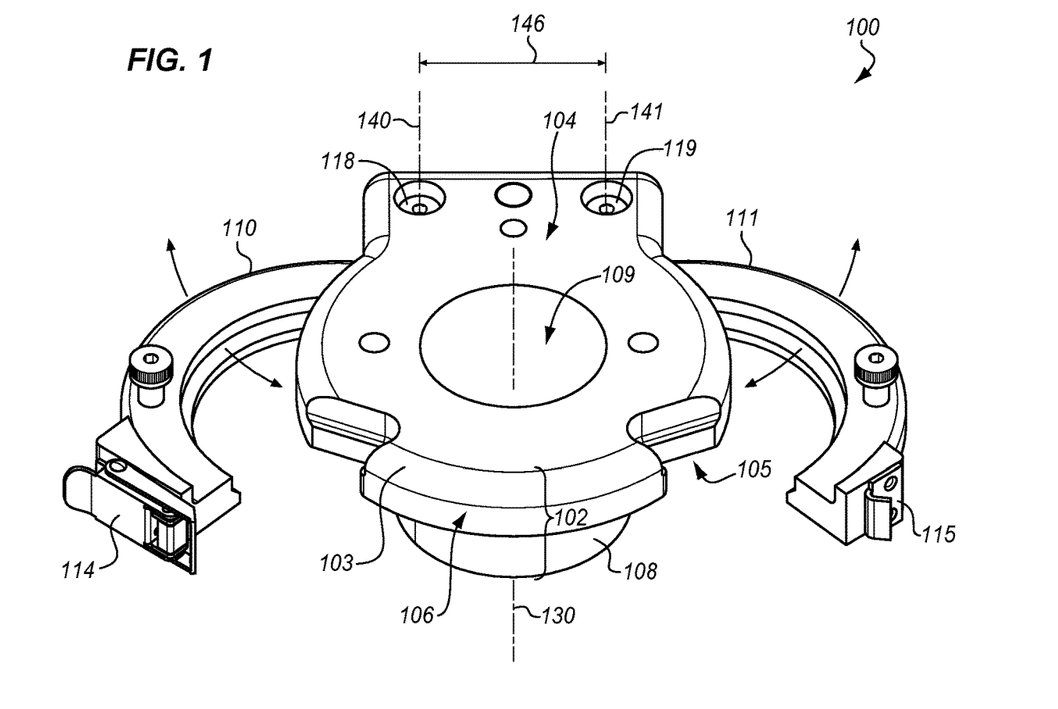
FIGS. 1-2 are perspective views of an orbital drill bushing adapter in an open position in an illustrative embodiment.
Figure 2:
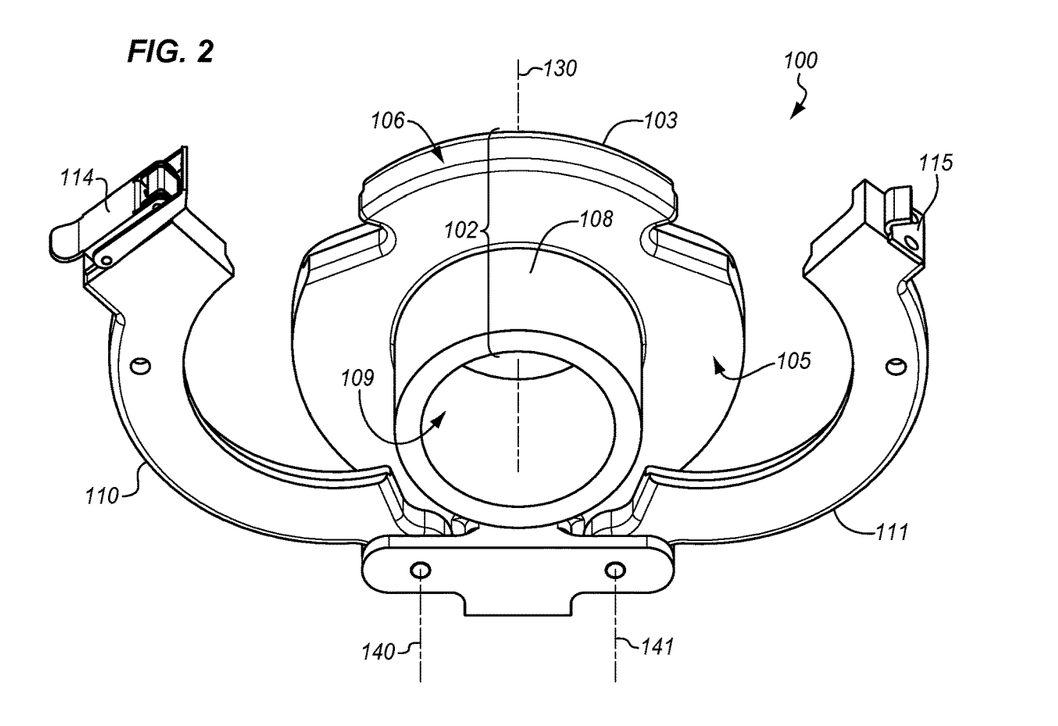

FIGS. 1-2 are perspective views of an orbital drill bushing adapter 100 in an open position in an illustrative embodiment. Orbital drill bushing adapter 100 is an apparatus, device, or equipment configured to attach to an orbital drill bushing to allow for drilling operations by other types of drill units (other than an orbital drill unit) at the location of the orbital drill bushing. As an overview, orbital drill bushing adapter 100 is configured to slide into a drill hole of an orbital drill bushing, and clamp onto the orbital drill bushing. Another type of drill unit, such as a power-feed drill, may then attach to orbital drill bushing adapter 100 to perform a drilling operation at the location of the orbital drill bushing. One benefit is that the orbital drill bushing does not have to be replaced at the location to perform another type of drilling operation, which saves manufacturing time.

Orbital drill bushing adapter 100 comprises a main body 102 and locking arms 110-111. Main body 102 may comprise a unibody structure or a structure comprised of multiple parts, and may be formed from a rigid material, such as metal. In this embodiment, main body 102 includes a base member 103 and a cylindrical spacer 108 that projects from base member 103. Base member 103 has an upper surface 104 (or upper face), and a lower surface 105 (or lower face) that opposes upper surface 104. Upper surface 104 represents a surface configured to face a drill unit, and lower surface 105 represents a surface configured to face or contact an orbital drill bushing (i.e., the top end of the orbital drill bushing). Base member 103 also has an external side wall 106 (or multiple side walls) that extends between upper surface 104 and lower surface 105. External side wall 106 defines the external shape, perimeter, or periphery of base member 103. Cylindrical spacer 108 projects generally perpendicular from lower surface 105 of base member 103 (see FIG. 2). Cylindrical spacer 108 is configured or sized to slide, fit, or be inserted into a drill hole of an orbital drill bushing. Main body 102 further includes a cylindrical hole 109 that passes through base member 103 and cylindrical spacer 108 to define a through-hole. As is evident in FIGS. 1-2, cylindrical hole 109 is co-axial with cylindrical spacer 108 along axis 130.

Locking arms 110-111 pivotally couple or connect to main body 102, or more particularly, to base member 103. Locking arms 110-111 are configured to clamp main body 102 onto an orbital drill bushing. Locking arms 110-111 are coupled to base member 103 so that they pivot towards and away from one another about base member 103. Locking arm 110 pivotally couples with base member 103 via an arm connector 118, and locking arm 111 pivotally couples with base member 103 via an arm connector 119. Arm connectors 118-119 may comprise bolts, pins, etc., that couple locking arms 110-111 to base member 103 while allowing locking arms 110-111 to pivot in relation to base member 103. Arm connector 118 defines a pivot axis 140 for locking arm 110, and arm connector 119 defines a pivot axis 141 for locking arm 111. In one embodiment, pivot axes 140-141 are parallel and spaced by a distance 146. Pivot axes 140-141 may also be disposed on the same side of cylindrical hole 109 so that the free ends of locking arms 110-111 are able to rotate toward one another, and to also pivot away from one another. When locking arms 110-111 pivot away from one another and are spread, orbital drill bushing adapter 100 is in the open position. When locking arms 110-111 pivot towards one another or converge, orbital drill bushing adapter 100 is in a clamped position. When in the clamped position, locking arms 110-111 may be secured to one another via clamp members 114-115.

Figure 3:
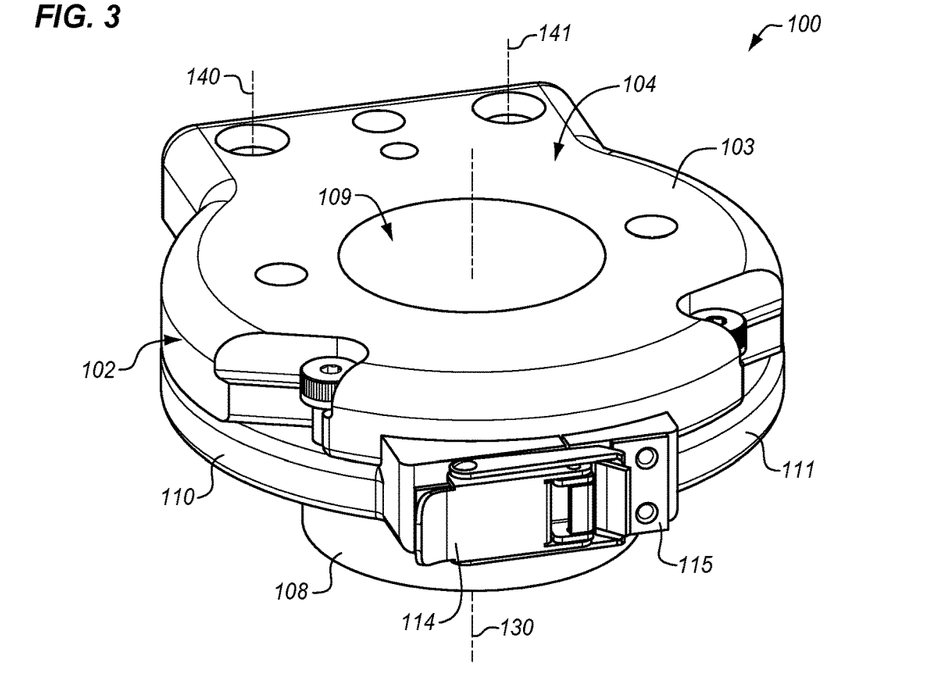
FIGS. 3-4 are perspective views of an orbital drill bushing adapter in a clamped position in an illustrative embodiment.
Figure 4:
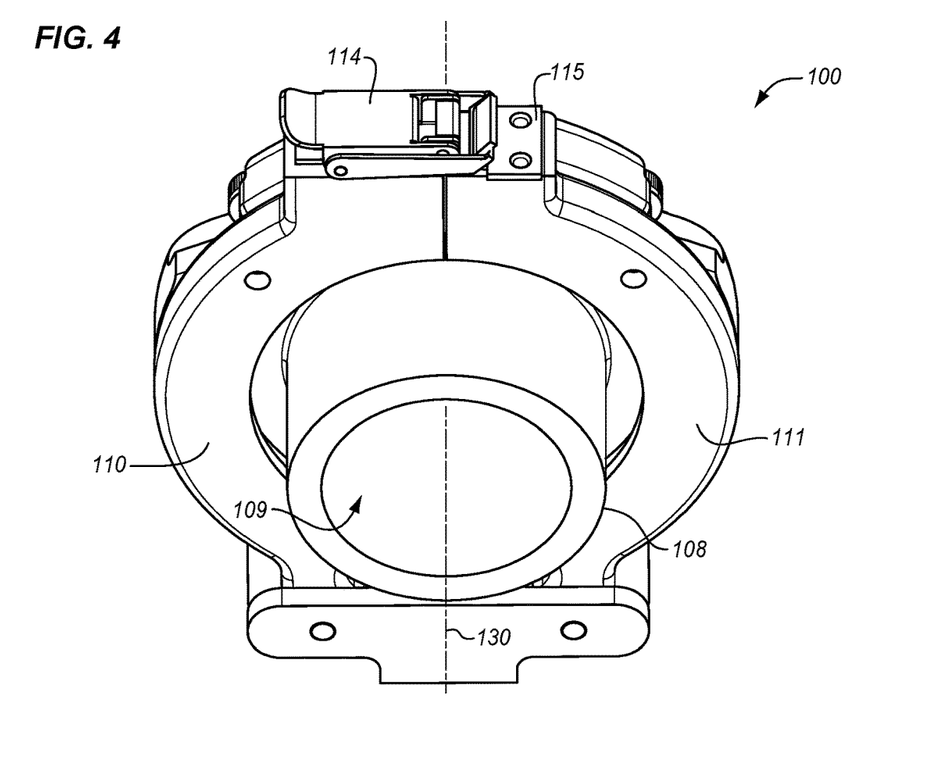

FIGS. 3-4 are perspective views of orbital drill bushing adapter 100 in a clamped position in an illustrative embodiment. As illustrated in these figures, locking arms 110-111 are rotated toward one another, and secured via clamp members 114-115. When in the clamped position, locking arms 110-111 engage with an orbital drill bushing to secure orbital drill bushing adapter 100 to the orbital drill bushing.

Figure 5:
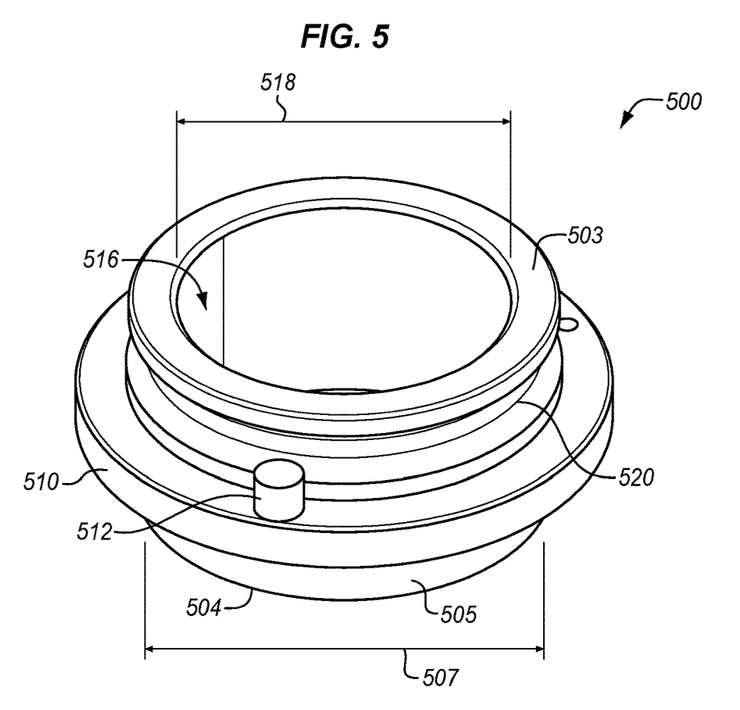
FIG. 5 is a perspective view of an orbital drill bushing.

FIG. 5 is a perspective view of an orbital drill bushing 500. Orbital drill bushing 500 is used to guide, position, and/or support a drill unit for an orbital drilling operation. For orbital drilling, a cutting tool rotates around its own axis and simultaneously about a center axis that is off-set from the axis of the cutting tool. Orbital drill bushing 500 is a hollow, cylindrical member having a top end 503, an opposing bottom end 504, an outer cylindrical surface 505, and a drill hole 516 that passes from top end 503 to bottom end 504. Outer cylindrical surface 505 has a diameter 507 that is sized to fit into a guide hole of a drill plate, and drill hole 516 has a diameter 518 that is sized to accommodate an orbital drill unit. Orbital drill bushing 500 also includes an annular collar 510 that surrounds outer cylindrical surface 505. An index pin 512 may project upward from annular collar 510 to assist an operator in locating an orbital drill unit onto orbital drill bushing 500. A data tag (not shown), such as a Radio Frequency Identification (RFID) tag, may also be mounted in or on annular collar 510. Orbital drill bushing 500 further includes an annular receiver groove 520. Annular receiver groove 520 is an indentation or depression, formed around part or the entire circumference of outer cylindrical surface 505, that is configured to engage with a coupler on an orbital drill unit (e.g., a ball-bearing coupler) or on a nosepiece of an orbital drill unit. When in use, the drill bit of the orbital drill unit is inserted through drill hole 516 and the nosepiece of the orbital drill unit attaches to orbital drill bushing 500 via annular receiver groove 520. The drill bit may then rotate and oscillate within drill hole 516 to cut a workpiece under the drill plate.

Figure 6:
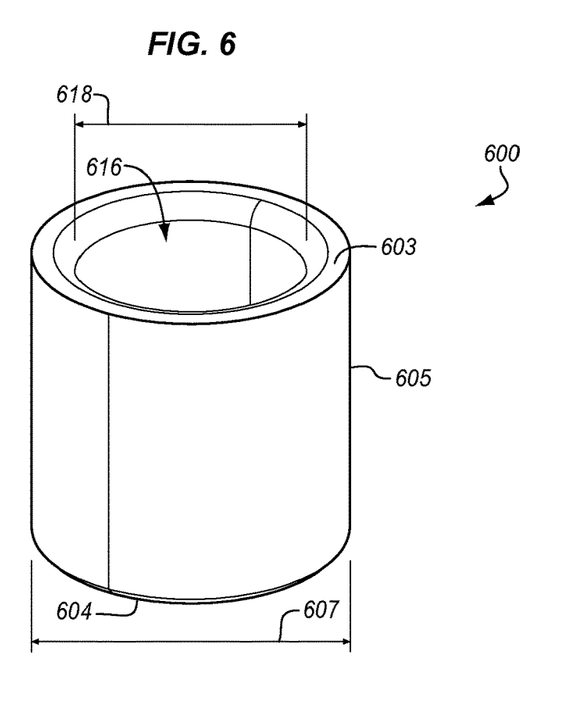
FIG. 6 is a perspective view of a conventional drill bushing.

FIG. 6 is a perspective view of a conventional drill bushing 600. Conventional drill bushing 600 is used to guide, position, and/or support a drill unit for a conventional (e.g., power-feed) drilling operation. Conventional drill bushing 600 is a hollow, cylindrical member having a top end 603, an opposing bottom end 604, an outer cylindrical surface 605, and a drill hole 616 that passes through conventional drill bushing 600 from top end 603 to bottom end 604. Outer cylindrical surface 605 has an outer diameter 607 that is sized to fit into a guide hole of a drill plate, and drill hole 616 has a diameter 618 that is sized to accommodate a conventional drill unit. When in use, the drill bit of the conventional drill unit passes through drill hole 616 and the nosepiece of the conventional drill unit attaches to conventional drill bushing 600, such as with a concentric collet. The drill bit may then rotate within drill hole 616 to cut a workpiece under the drill plate.

As is evident in FIGS. 5-6, orbital drill bushings have a different structure than other types of drill bushings. Presently, when an orbital drill bushing is inserted in a drill plate, the orbital drill bushing can only be used for orbital drilling operations. If an operator wanted to perform another type of drilling operation at that location, the operator would have to remove the drill plate or remove the orbital drill bushing from the drill plate and replace it with another type of drill bushing, which is time consuming. Instead of removing the drill plate or orbital drill bushing, an operator may use orbital drill bushing adapter 100 as described herein so that other types of drilling operations may be performed at the location of an orbital drill bushing. With locking arms 110-111 of orbital drill bushing adapter 100 in an open position as shown in FIGS. 1-2, the operator inserts cylindrical spacer 108 into drill hole 516 of orbital drill bushing 500. With cylindrical spacer 108 seated in orbital drill bushing 500, the operator may close locking arms 110-111 as shown in FIGS. 3-4 to clamp orbital drill bushing adapter 100 onto orbital drill bushing 500. Locking arms 110-111 engage with annular receiver groove 520 of orbital drill bushing 500 to securely lock orbital drill bushing adapter 100 onto orbital drill bushing 500. The following further describes structural elements of orbital drill bushing adapter 100.

Figure 7:
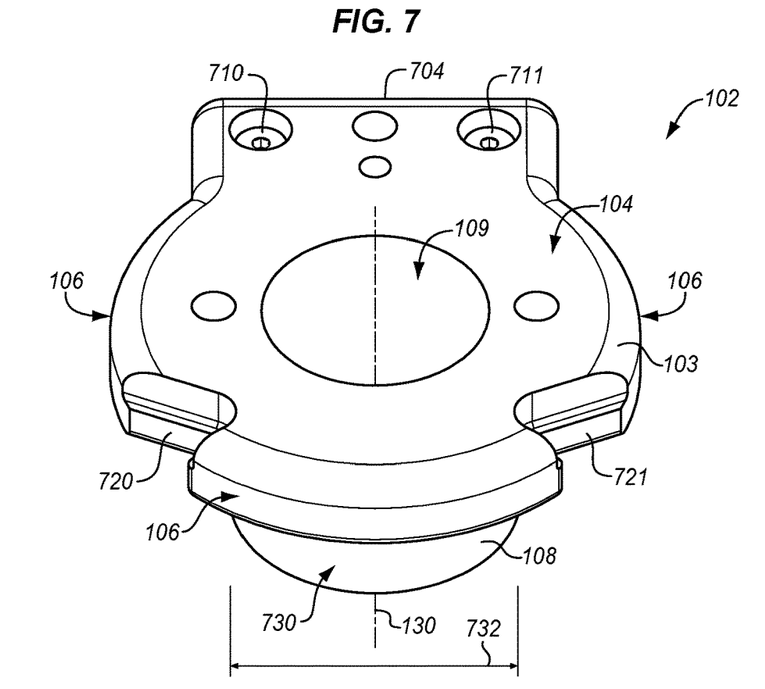
FIGS. 7-8 are perspective views of a main body in an illustrative embodiment.
Figure 8:
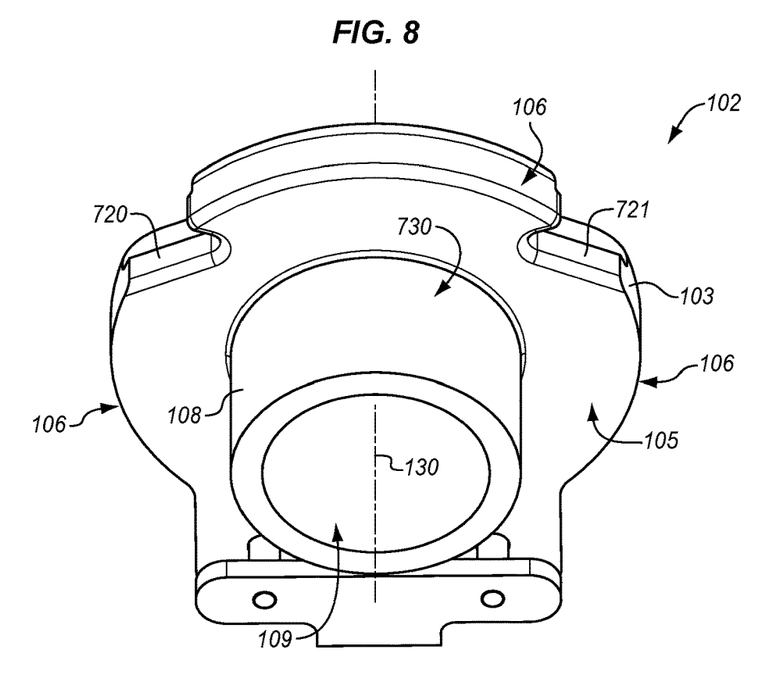

FIGS. 7-8 are perspective views of main body 102 in an illustrative embodiment. Main body 102 includes base member 103 and cylindrical spacer 108. Upper surface 104 of base member 103 is configured to face toward a drill unit. Upper surface 104 may be flat or may have surface features to interface with the drill unit. Lower surface 105 is configured to face toward an orbital drill bushing. Lower surface 105 may be flat or may have surface features to interface with the orbital drill bushing. Cylindrical spacer 108 projects from lower surface 105 of base member 103. Cylindrical spacer 108 is a cylindrical member with cylindrical hole 109 passing through its center. The outer cylindrical surface 730 of cylindrical spacer 108 has a diameter 732 that is sized or configured to fit into drill hole 516 of orbital drill bushing 500. The length of cylindrical spacer 108 may be less than or equal to the length of orbital drill bushing 500.

The shape of base member 103 is generally cylindrical to define external side wall 106. External side wall 106 extends radially outward further than outer cylindrical surface 730 of cylindrical spacer 108. In this embodiment, base member 103 may include a shoulder 704 that projects outward from external side wall 106 in a radial direction from axis 130 of cylindrical hole 109. Shoulder 704 provides a mounting location for locking arms 110-111. Base member 103 includes a pair of arm mounting holes 710-711 at shoulder 704 that receive arm connectors 118-119, respectively (see FIG. 1). Base member 103 may further include arm support slots 720-721 that indent inward from external side wall 106, and are configured to receive axial support bolts on locking arms 110-111, respectively, as is described below.

Figure 9:
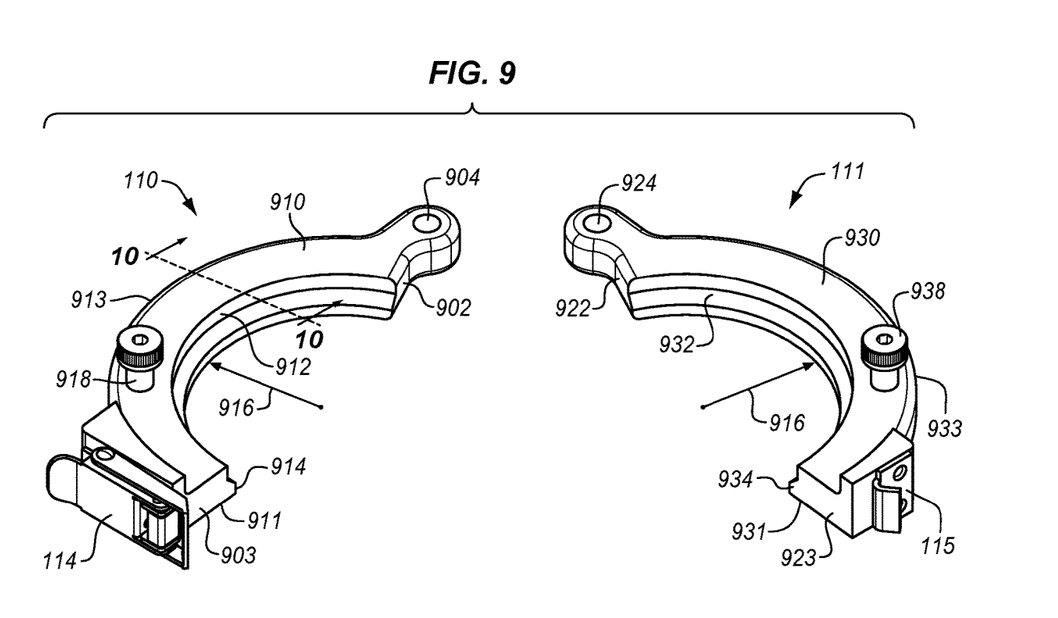
FIG. 9 is a perspective view of locking arms in an illustrative embodiment.

FIG. 9 is a perspective view of locking arms 110-111 in an illustrative embodiment. Locking arm 110 is an elongated member having ends 902-903, and a top side 910, a bottom side 911, an inner side 912, and an outer side 913 along its length. End 902 (which may be referred to as a coupled end) has a mounting hole 904 configured to pivotally attach locking arm 110 to base member 103 via arm connector 118 (see FIG. 1). Clamp member 114 is mounted on end 903

(which may be referred to as a free end). Top side 910 of locking arm 110 may be generally flat as shown in FIG. 9 so that locking arm 110 is free to rotate in relation to base member 103. As shown in FIG. 2, locking arm 110 attaches to base member 103 beneath lower surface 105. Thus, top side 910 is shaped so that locking arm 110 is able to rotate beneath lower surface 105 of base member 103 toward cylindrical spacer 108. Bottom side 911 of locking arm 110 may also be generally flat, as locking arm 110 may be near or resting on the top surface of a drill plate when in use. Inner side 912 of locking arm 110 faces toward cylindrical spacer 108 when locking arm 110 is attached to base member 103, and may be curved inward or concave between ends 902-903. Outer side 913 of locking arm 110 is opposite inner side 912, and may be curved outward or convex between ends 902-903. In one embodiment, an axial support bolt 918 may be attached to top side 910 of locking arm 110 to engage arm support slot 720 of base member 103 (see FIGS. 7-8). When engaged with arm support slot 720, axial support bolt 918 provides axial support of locking arm 110.

At least a portion of inner side 912 of locking arm 110 tapers from bottom side 911 to top side 910 to form a coupling lip 914. Coupling lip 914 comprises a protrusion that projects from a surface of inner side 912, and is concave between ends 902-903 of locking arm 110. Coupling lip 914 is configured to couple or engage with annular receiver groove 520 on orbital drill bushing 500. The radius 916 of curvature of coupling lip 914 corresponds with the radius of curvature of the annular receiver groove 520 on orbital drill bushing 500.

Figure 10:
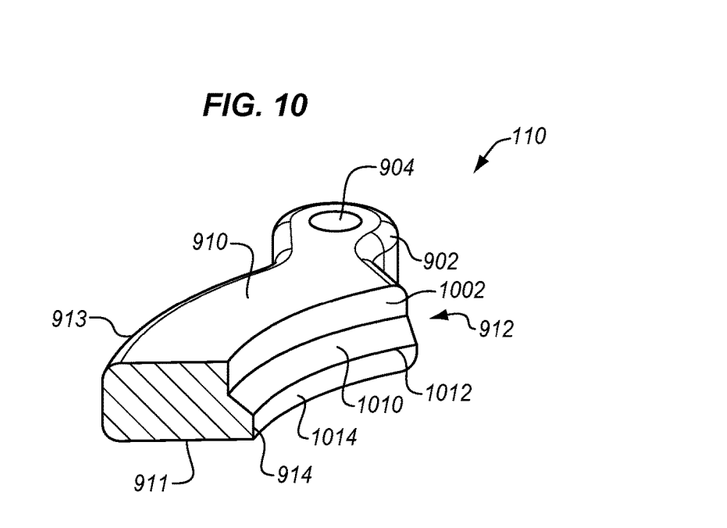
FIG. 10 is a cross-sectional view of a locking arm in an illustrative embodiment.

FIG. 10 is a cross-sectional view of locking arm 110 in an illustrative embodiment. The view in FIG. 10 is across a cut plane indicated by view arrows 10-10 in FIG. 9. In one embodiment, inner side 912 has a concave surface 1002, and coupling lip 914 projects from concave surface 1002. Coupling lip 914 may project from concave surface 1002 perpendicularly, at an angle, in a curved manner, etc., to engage with annular receiver groove 520. In the embodiment, coupling lip 914 may project at an angle from concave surface 1002 via an angled surface 1010. A projecting edge 1012 is therefore formed where angled surface 1010 intersects a concave surface 1014 of coupling lip 914. This structure of coupling lip 914 allows for locking arm 110 to securely engage annular receiver groove 520, as the angle of angled surface 1010 may correspond with an angled surface of annular receiver groove 520. Angled surface 1010 of coupling lip 914 acts to pull main body 102 downward toward the drill plate when locking arm 110 is closed to oppose the axial forces of a drill unit.

In FIG. 9, locking arm 111 is also an elongated member having ends 922-923, and a top side 930, a bottom side 931, an inner side 932, and an outer side 933 along its length. End 922 has a mounting hole 924 configured to pivotally attach locking arm 111 to base member 103 via arm connector 119 (see FIG. 1). Clamp member 115 is mounted on end 923. Top side 930 of locking arm 111 may be generally flat as shown in FIG. 9 so that locking arm 111 is free to rotate in relation to base member 103. As shown in FIG. 2, locking arm 111 attaches to base member 103 beneath lower surface 105. Thus, top side 930 is shaped so that locking arm 111 is able to rotate beneath lower surface 105 of base member 103 toward cylindrical spacer 108. Bottom side 931 of locking arm 111 may also be generally flat, as locking arm 111 may be near or resting on the top surface of a drill plate when in use. Inner side 932 of locking arm 111 faces toward cylindrical spacer 108 when locking arm 111 is attached to base member 103, and may be curved inward or concave between ends 922-923. Outer side 933 of locking arm 111 is opposite inner side 932, and may be curved outward or convex between ends 922-923. In one embodiment, an axial support bolt 938 may be attached to top side 930 of locking arm 111 to engage arm support slot 721 of base member 103 (see FIGS. 7-8). When engaged with arm support slot 721, axial support bolt 938 provides axial support of locking arm 111.

At least a portion of inner side 932 of locking arm 111 tapers from bottom side 931 to top side 930 to form a coupling lip 934, similar to coupling lip 914. Coupling lip 934 is configured to couple or engage with the annular receiver groove 520 on orbital drill bushing 500. The radius 916 of curvature of coupling lip 934 corresponds with the radius of curvature of the annular receiver groove 520 on orbital drill bushing 500. A cross-section of locking arm 111 may be similar as shown in FIG. 10 for locking arm 110.

Figure 11:
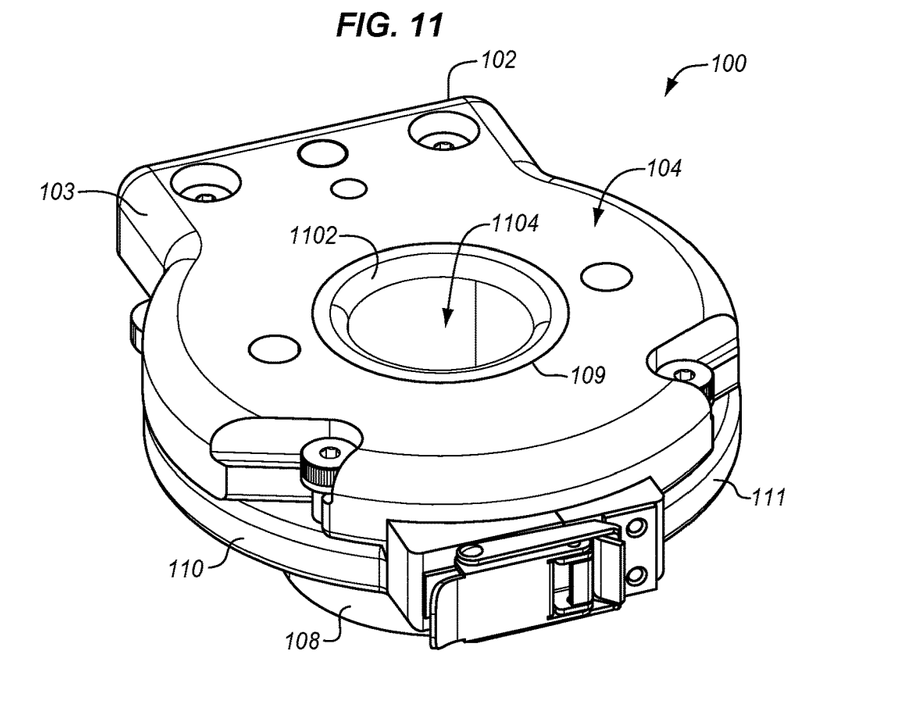
FIG. 11 is a perspective view of an orbital drill bushing adapter in another illustrative embodiment.

FIG. 11 is a perspective view of orbital drill bushing adapter 100 in an illustrative embodiment. In this embodiment, a drill bushing 1102 is pressed, placed, or otherwise inserted in cylindrical hole 109 of main body 102. Drill bushing 1102 has a drill hole 1104, which has a smaller diameter than drill hole 516 of orbital drill bushing 500. Drill bushing 1102 may comprise a conventional drill bushing 600 as shown in FIG. 6, or another type of non-orbital drill bushing. Drill bushing 1102 is configured to guide, position, and/or support a non-orbital drill unit, such as a power-feed drill unit. For example, a concentric collet on the nosepiece of a drill unit may be inserted into drill hole 1104 of drill bushing 1102 to guide the drill unit. Drill bushing 1102 may be replaceable if worn, or to accommodate different types of drill units or cutting tools.

Figure 12:
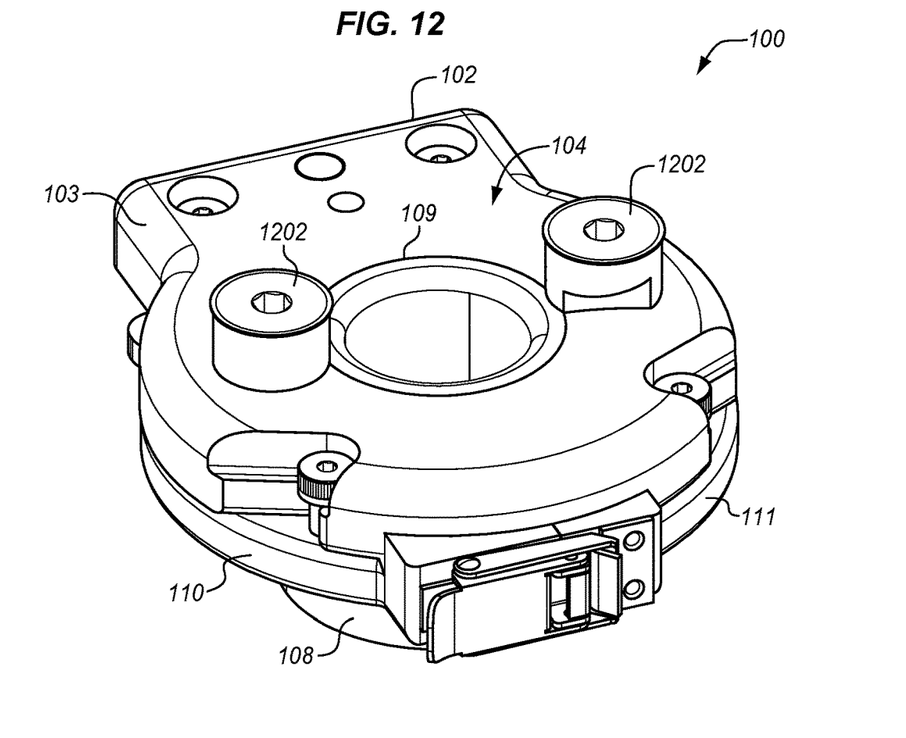
FIG. 12 is a perspective view of an orbital drill bushing adapter in another illustrative embodiment.

FIG. 12 is a perspective view of orbital drill bushing adapter 100 in an illustrative embodiment. In this embodiment, orbital drill bushing adapter 100 includes twist-lock fasteners 1202 affixed to base member 103. Twist-lock fasteners 1202 may screw into base member 103 from upper surface 104 on opposing sides of cylindrical hole 109 to project generally perpendicular from upper surface 104. Twist-lock fasteners 1202 are configured to engage with a twist-lock feature on a nosepiece of a drill unit.

Figure 13:
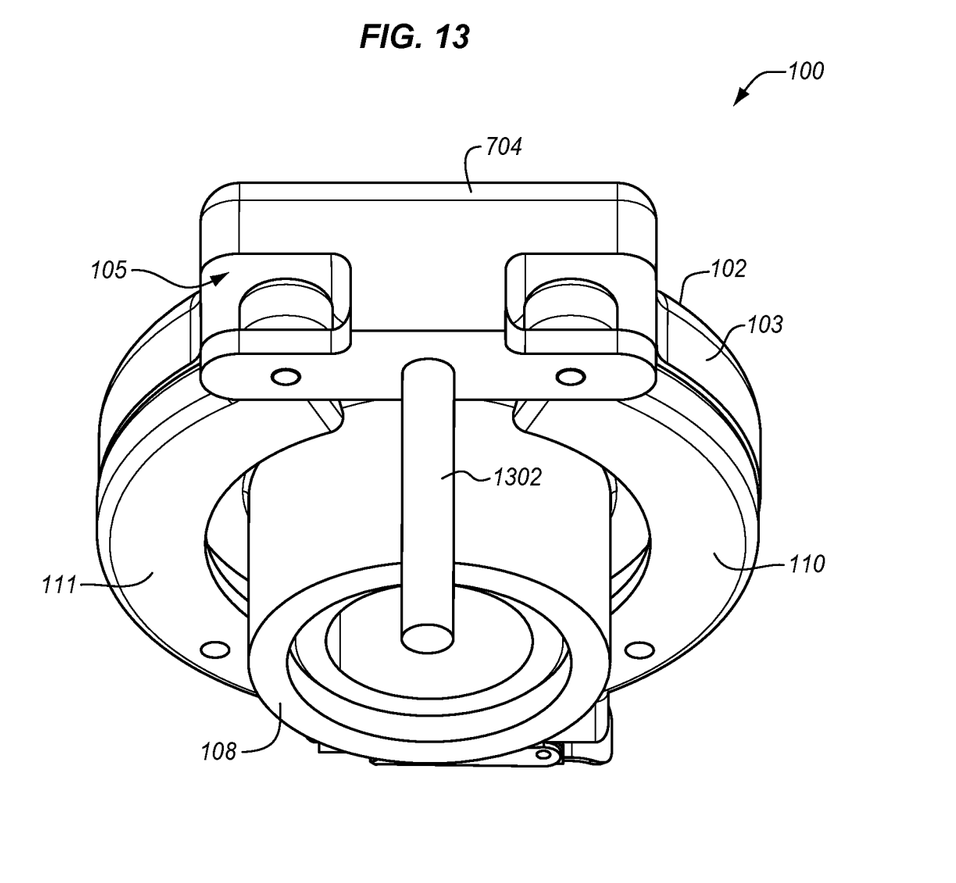
FIG. 13 is a perspective view of an orbital drill bushing adapter in another illustrative embodiment.

FIG. 13 is a perspective view of orbital drill bushing adapter 100 in an illustrative embodiment. In this embodiment, orbital drill bushing adapter 100 includes a locking pin 1302 that projects from base member 103 generally perpendicular from lower surface 105. Locking pin 1302 is disposed at a distance radially from cylindrical spacer 108, and is configured to fit in a hole in a drill plate proximate to orbital drill bushing 500. When inserted in a hole, locking pin 1302 prevents rotation of orbital drill bushing adapter 100.

Figure 14:
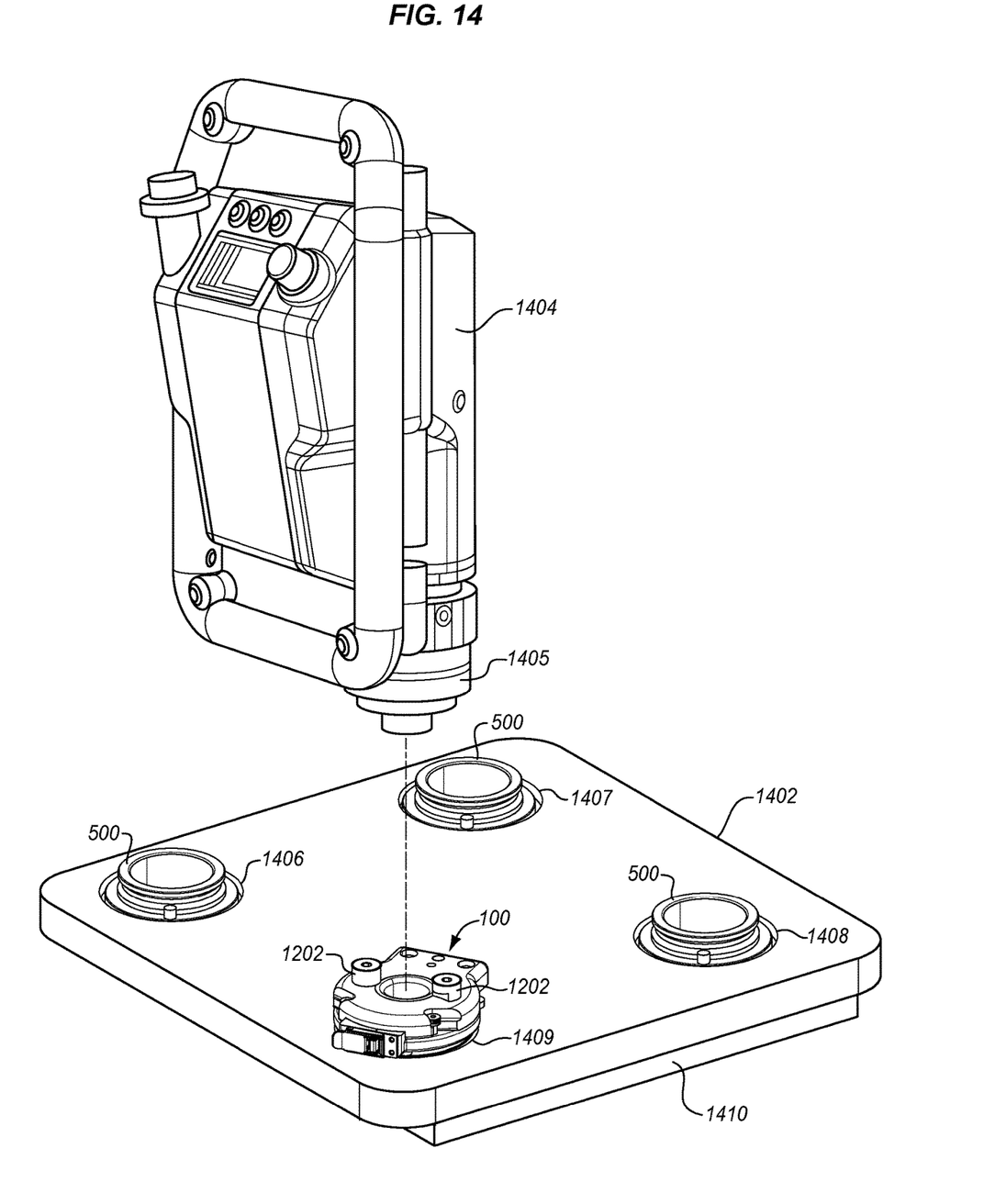
FIG. 14 is a perspective view of a drilling operation using an orbital drill bushing adapter in an illustrative embodiment.

FIG. 14 is a perspective view of a drilling operation using orbital drill bushing adapter 100 in an illustrative embodiment. A drill plate 1402 (also referred to as a drill jig) is a type of fixture or template used to control the location of a drilling operation by a drill unit 1404. Drill plate 1402 includes one or more guide holes 1406-1409 where an orbital drill bushing 500 is inserted. Drill plate 1402 is positioned on a workpiece 1410 (or vice-versa), and drill unit 1404 (a non-orbital drill unit) is able to form holes in workpiece 1410 at one or more locations of guide holes 1406-1409. Workpiece 1410 may be formed from metal materials, such as Titanium, Aluminum, etc., may be formed from composite materials, such as a Carbon Fiber Reinforced Polymer (CFRP), Carbon Fiber Reinforced Plastic (CRP), Carbon Fiber Reinforced Thermoplastic (CFRTP), etc., or may be formed from another type of material.

Workpiece 1410 may represent a part of an aircraft, an automobile, a watercraft, or some other machine being fabricated.

In this embodiment, it is assumed that an orbital drill bushing 500 is inserted in guide hole 1409 much as is illustrated for guide holes 1406-1408. If an operator would like to perform another type of drilling operation at the location of guide hole 1409, then the operator may use an orbital drill bushing adapter 100 as described above. The operator opens the locking arms 110-111 of orbital drill bushing adapter 100 as shown in FIGS. 1-2, and inserts cylindrical spacer 108 of orbital drill bushing adapter 100 in the drill hole 516 of orbital drill bushing 500 (see FIG. 5). Locking pin 1302 of orbital drill bushing adapter 100 (see FIG. 13) may also be inserted a hole in drill plate 1402 proximate to orbital drill bushing 500. With cylindrical spacer 108 seated in orbital drill bushing 500, the operator closes locking arms 110-111 as shown in FIGS. 3-4 so that the coupling lips 914/934 engage annular receiver groove 520 on opposing sides of orbital drill bushing 500 (see FIG. 5). When locking arm 110 is closed, axial support bolt 918 engages arm support slot 720 of base member 103 (see FIGS. 7-9). When locking arm 111 is closed, axial support bolt 938 engages arm support slot 721 of base member 103 (see FIGS. 7-9). The operator may then secure clamp member 114 of locking arm 110 with clamp member 115 of locking arm 111 so that locking arms 110-111 are fastened to one another. With orbital drill bushing adapter 100 secured to orbital drill bushing 500, the operator may attach drill unit 1404 to orbital drill bushing adapter 100. For example, the nosepiece 1405 of drill unit 1404 may engage with twist-lock fasteners 1202 on orbital drill bushing adapter 100. Orbital drill bushing adapter 100 guides, positions, and supports drill unit 1404 to form a hole in workpiece 1410. Thus, a drilling operation (i.e., non-orbital) may be performed at the location of guide hole 1409 even though an orbital drill bushing 500 is installed at this location. This is advantageous as the operator does not need to remove drill plate 1402 or orbital drill bushing 500 to perform other types of drilling operations at this location.

To remove orbital drill bushing adapter 100, locking arms 110-111 are pivoted away from one another to the open position. With locking arms 110-111 pivoted open, the coupling lips 914/934 disengage from annular receiver groove 520 so that orbital drill bushing adapter 100 may be pulled from orbital drill bushing 500. Orbital drill bushing 500 may then be used for orbital drilling operations again, or another type of orbital drill bushing adapter 100 may be attached to orbital drill bushing 500 at the location of guide hole 1409.

Although specific embodiments were described herein, the scope is not limited to those specific embodiments. Rather, the scope is defined by the following claims and any equivalents thereof.

The invention claimed is:

1. An orbital drill bushing adapter comprising:
a main body comprising:
a base member having an upper surface, a lower surface, and an external side wall that extends between the upper surface and the lower surface;
a cylindrical spacer that projects from the lower surface of the base member, and is configured to fit in a drill hole of an orbital drill bushing; and
a cylindrical hole that passes through the base member and the cylindrical spacer; and locking arms pivotally coupled to the base member to pivot towards one another about the base member and engage, the orbital drill bushing.

2. The orbital drill bushing adapter of claim 1 wherein:
the locking arms are configured to engage an annular receiver groove on the orbital drill bushing when the locking arms are in a clamped position.

3. The orbital drill bushing adapter of claim 2 wherein:
the locking arms are elongated members having a first end and a second end, and having an inner side between the first end and the second end that faces toward the cylindrical spacer;
the first end includes a mounting hole configured to pivotally couple the locking arms to the base member via an arm connector; and
a clamp member mounted on the second end.

4. The orbital drill bushing adapter of claim 3 wherein:
the inner side is concave between the first end and the second end; and
the inner side includes a coupling lip configured to engage the annular receiver groove on the orbital drill bushing.

5. The orbital drill bushing adapter of claim 4 wherein:
a radius of curvature of the coupling lip corresponds with a radius of curvature of the annular receiver groove on the orbital drill bushing.

6. The orbital drill bushing adapter of claim 4 wherein:
the inner side has a concave surface, and the coupling lip projects from the concave surface via an angled surface.

7. The orbital drill bushing adapter of claim 3 wherein:
arm support slots indent inward from the external side wall of the base member; and
the locking arms further include axial support bolts attached to a top side of the locking arms to engage the arm support slots when the locking arms are pivoted towards one another.

8. The orbital drill bushing adapter of claim 1 wherein:
a shoulder projects outward from the external side wall in a radial direction from an axis of the cylindrical hole;
the locking arms are pivotally coupled to the base member at the shoulder via arm connectors; and
the arm connectors define pivot axes for the locking arms that are parallel and spaced by a distance on a side of the cylindrical hole.

9. The orbital drill bushing adapter of claim 1 wherein the main body further comprises:
a drill bushing inserted in the cylindrical hole that is configured to guide a non-orbital drill unit.

10. The orbital drill bushing adapter of claim 1 wherein the main body further comprises:
twist-lock fasteners that project perpendicularly from the upper surface of the base member, and configured to engage with a twist-lock feature on a nosepiece of a drill unit.

11. The orbital drill bushing adapter of claim 1 wherein the main body further comprises:
a locking pin that projects perpendicularly from the lower surface of the base member, and is disposed at a distance radially from the cylindrical spacer.

12. An orbital drill bushing adapter comprising:
a main body comprising:
a base member having an upper surface configured to face a drill unit, and a lower surface configured to contact a top end of an orbital drill bushing;
a cylindrical spacer that projects from the lower surface of the base member, and is configured to fit into a drill hole of the orbital drill bushing; and a cylindrical hole that passes through the base member and the cylindrical spacer; and locking arms pivotally coupled to the base member, and configured to pivot towards and away from one another about the base member;

the locking arms, when pivoted towards one another, are configured to engage an annular receiver groove on the orbital drill bushing.

13. The orbital drill bushing adapter of claim 12 wherein:

an inner side of the locking arms is concave between a first end and a second end;

the first end is pivotally coupled to the base member;

a clamp member is mounted on the second end; and the inner side of the locking arms includes a coupling lip that projects from a surface of the inner side, and is configured to engage the annular receiver groove.

14. The orbital drill bushing adapter of claim 13 wherein:

the coupling lip projects at an angle from the surface that corresponds with an angled surface of the annular receiver groove.

15. The orbital drill bushing adapter of claim 12 wherein:

the base member further has an external side wall that extends between the upper surface and the lower surface, and a shoulder that projects outward from the external side wall in a radial direction from an axis of the cylindrical hole;

the locking arms are pivotally coupled to the base member at the shoulder via arm connectors; and the arm connectors define pivot axes for the locking arms that are parallel and spaced by a distance on a side of the cylindrical hole.

16. The orbital drill bushing adapter of claim 12 wherein:

the base member further has an external side wall that extends between the upper surface and the lower surface, and arm support slots that indent inward from the external side wall; and the locking arms include axial support bolts attached to a top side of the locking arms to engage the arm support slots when the locking arms are pivoted towards one another.

17. The orbital drill bushing adapter of claim 12 wherein the main body further comprises:

a drill bushing inserted in the cylindrical hole that is configured to guide a non-orbital drill unit.

18. The orbital drill bushing adapter of claim 12 wherein the main body further comprises:

twist-lock fasteners that project from the upper surface of the base member on opposite sides of the cylindrical hole, and configured to couple with a nosepiece of the drill unit.

19. The orbital drill bushing adapter of claim 12 wherein the main body further comprises:

a locking pin that projects perpendicularly from the lower surface of the base member at a distance radially from the cylindrical spacer, and is configured to fit in a hole in a drill plate proximate to the orbital drill bushing.

20. An orbital drill bushing adapter comprising:

a main body, and locking arms pivotally coupled to the main body;

the main body comprising:

a base member having an upper surface and a lower surface;

a cylindrical spacer that projects from the lower surface of the base member, and is configured to fit in a drill hole of an orbital drill bushing;

a cylindrical hole that passes through the base member and the cylindrical spacer; and a drill bushing inserted in the cylindrical hole that is configured to guide a non-orbital drill unit;

wherein the locking arms are configured to pivot away from one another to an open position, and to pivot towards one another to a clamped position;

wherein the locking arms each include a coupling lip configured to engage an annular receiver groove on the orbital drill bushing when the locking arms are in the clamped position;

wherein the locking arms further include clamp members configured to secure the locking arms together in the clamped position.

* * * * *